United States Patent
Wang et al.

(10) Patent No.: US 7,974,336 B2
(45) Date of Patent: Jul. 5, 2011

(54) EQUALIZATION SYSTEM AND METHOD THEREOF

(75) Inventors: Wei-Ting Wang, Yilan County (TW); Ming-Luen Liou, Taipei County (TW)

(73) Assignee: Mediatek Inc., Hsin-Chu, Taiwan (CN)

( * ) Notice: Subject to any disclaimer, the term of this patent is extended or adjusted under 35 U.S.C. 154(b) by 691 days.

(21) Appl. No.: 12/107,927

(22) Filed: Apr. 23, 2008

(65) Prior Publication Data
US 2009/0268799 A1 Oct. 29, 2009

(51) Int. Cl.
*H03H 7/40* (2006.01)
(52) U.S. Cl. ......... 375/233; 375/232; 375/350; 708/323
(58) Field of Classification Search .................. 375/229, 375/232, 233, 350; 708/300, 301, 322, 323
See application file for complete search history.

(56) References Cited

U.S. PATENT DOCUMENTS

| | | | | |
|---|---|---|---|---|
| 5,539,774 A | * | 7/1996 | Nobakht et al. | 375/232 |
| 7,646,806 B2 | * | 1/2010 | Cohen | 375/231 |
| 7,693,214 B2 | * | 4/2010 | Shida | 375/232 |
| 2008/0063041 A1 | | 3/2008 | Galperin et al. | |

FOREIGN PATENT DOCUMENTS

EP 1246418 10/2002

* cited by examiner

*Primary Examiner* — Dac V Ha
(74) *Attorney, Agent, or Firm* — Thomas|Kayden (57) ABSTRACT

An equalization system used in a communication receiver has multiple equalization stages. A front equalizer supplies equalization output to a feed back filter in a rear equalizer to speed initialization of the rear equalizer. In addition, the rear equalizer supplies decision output to the front equalizer to estimate errors so as to provide more accurate tap coefficient adjustments. Both the front equalizer and the rear equalizer can be implemented with iterative equalizers to further enhance equalization performance.

20 Claims, 7 Drawing Sheets

FIG. 7

EQUALIZATION SYSTEM AND METHOD THEREOF

BACKGROUND OF THE INVENTION

1. Field of the Invention

The invention relates to equalization and particularly relates to iterative equalizer structure containing a plurality of equalizers.

2. Description of the Related Art

To compensate the effects of a band-limited transmission channel, many digital data communication systems employ an equalizer to remove intersymbol interference (ISI) in the received signal. ISI causes the value of a given symbol to be distorted by the values of preceding and following symbols, and essentially represents symbol "ghosts" since ISI includes advanced and delayed symbols with respect to a reference symbol location in a given decision region. These distortions limit data rate efficiency for communication over such channels. Accordingly, a subject reducing the effect of such channel distortions is of great interest.

BRIEF SUMMARY OF THE INVENTION

A first preferred embodiment is a method for performing equalization in a communication receiver, comprising: generating a decision output from a rear equalizer of the communication receiver; estimating an estimated error by comparing the decision output of the rear equalizer and equalization output of a front equalizer of the communication receiver; and adjusting the front equalizer according to the estimated error, wherein the communication receiver has more than two equalizer stages, and the front equalizer is at an earlier stage than the rear equalizer.

A second preferred embodiment is a method for performing equalization in a communication receiver, comprising: generating an equalization output from a front equalizer of the communication receiver; supplying the equalization output to a feedback filter of a rear equalizer of the communication receiver for initialization; and performing equalization in the rear equalizer by the initialized feedback filter of the rear equalizer, wherein the communication receiver has more than two equalizer stages, and the front equalizer is at an earlier stage than the rear equalizer.

A third preferred embodiment is an equalization system used in a communication receiver, comprising: a front equalizer comprising a first feed forward filter, a first feedback filter, a first combiner and a first decision unit, wherein the first combiner combines output of the first feed forward filter and the first feedback filter to generate first equalization output; the first decision unit decides first set of discrete values based on the first equalization output; and the first equalization output are supplied to the first feedback filter; a rear equalizer comprising a second feed forward filter, a second feedback filter, a second combiner and a second decision unit, wherein the second combiner combines output of the second feed forward filter and the second feedback filter to generate second equalization output; the second decision unit decides second set of discrete values based on the second equalization output; and the second equalization output are supplied to the second feedback filter; an error estimator receiving the second set of discrete values and the first equalization output to obtain an estimated error; and a tap coefficient unit for adjusting tap coefficients of at least one of the first feed forward filter and the first feedback filter, wherein the front equalizer is at an earlier stage than the rear equalizer in multiple equalizer stages of the communication receiver.

A fourth preferred embodiment according to the invention is an equalization system used in a communication receiver, comprising: a front equalizer comprising a first feed forward filter, a first feedback filter, a first combiner and a first decision unit, wherein the first combiner combines output of the first feed forward filter and the first feedback filter to generate first equalization output; the first decision unit decides first set of discrete values based on the first equalization output; and the first equalization output are supplied to the first feedback filter; a rear equalizer comprising a second feed forward filter, a second feedback filter, a second combiner and a second decision unit, wherein the second combiner combines output of the second feed forward filter and the second feedback filter to generate second equalization output; the second decision unit decides second set of discrete values based on the second equalization output; and the second equalization output are supplied to the second feedback filter; and wherein the first equalization output are supplied to the second feedback filter for initialization.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
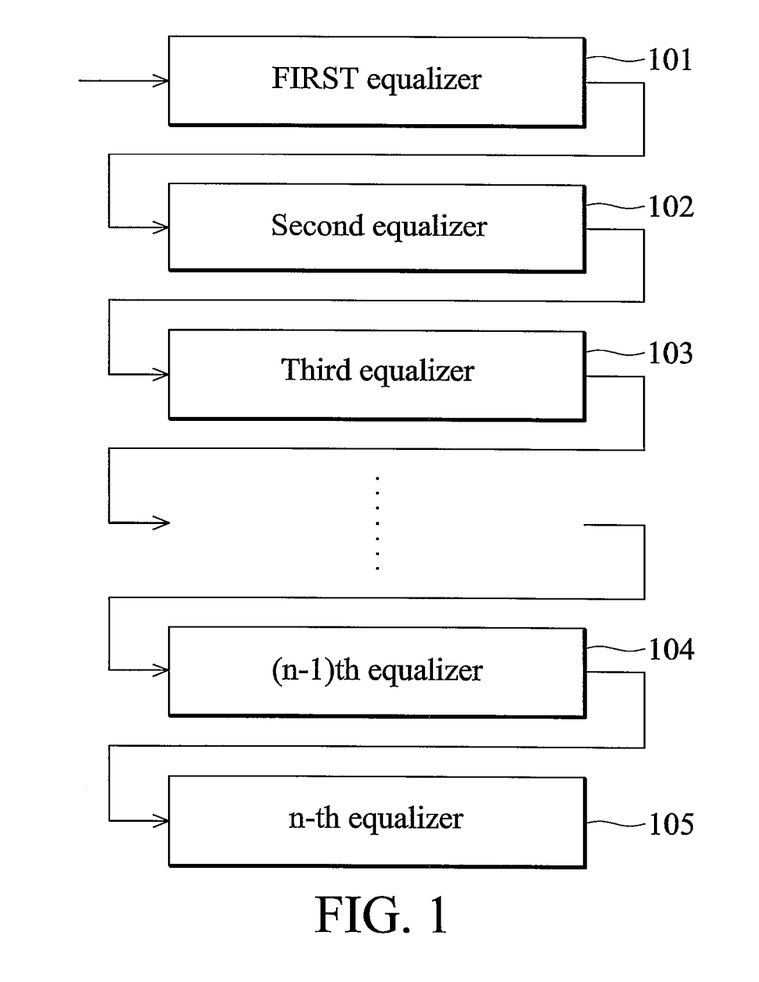
FIG. 1 illustrates an equalization system that has multiple equalizer stages.

FIG. 1 illustrates an equalization system that has multiple equalizer stages. In this example, the output of the first equalizer 101 is supplied to the second equalizer 102. The output of the second equalizer 102 is supplied to the third equalizer 103. In such manner, the output of the (n−1)-th equalizer 104 is supplied to the n-th equalizer 105. In the multiple equalizer stages, k-th equalizer is called at an earlier stage than the r-th equalizer if r is bigger than k. On the other hand, k-th equalizer is called at a latter stage than the r-th equalizer if r is smaller than k. Also, (k−1)-th equalizer is called "previously adjacent" to the k-th equalizer. The n-th equalizer 105 which is the last equalizer in the multiple equalizer stages provides equalization output to be used by a communication receiver. In such multiple equalizer stages, equalizers, except the last equalizer, generate intermediate equalization output to be used by other equalizers in the multiple stages. Theoretically, the final equalization output contains less ISI after such multiple equalizer stages.

The following preferred embodiments, however, provide different ways to interconnect equalizers in multiple equalizer stages. In the following examples, a front equalizer is closer to the last equalizer that generates final equalization output than a rear equalizer. Similarly, the front equalizer is called at an earlier stage than the rear equalizer. The front equalizer may be previously adjacent to the rear equalizer. Alternatively, there may have one or more than one equalizers between the front equalizer and the rear equalizer in an equalization system that contains multiple equalizer stages.

Figure 2:
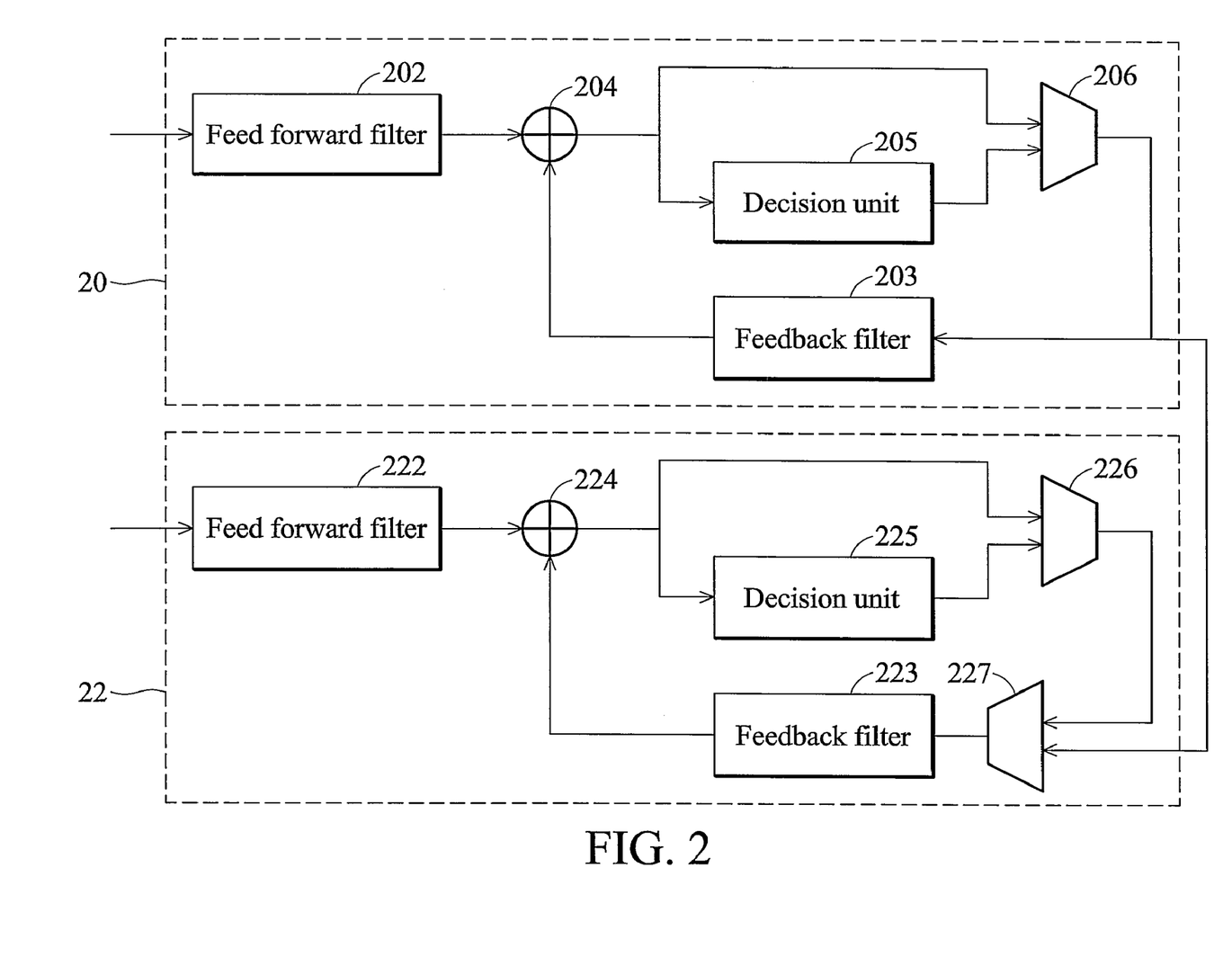
FIG. 2 illustrates a front equalizer supplies its equalization output to a rear equalizer to speed initialization of a feedback filter of the rear equalizer.

FIG. 2 illustrates interconnection between such a front equalizer 20 and a rear equalizer 22. The front equalizer 20 has a feed forward filter 202, a feedback filter 203, a combiner 204, a decision unit 205 and a switcher 206. The combiner 204 combines the outputs from the feed forward filter 202 and the feedback filter 203. The combined outputs are decided by the decision unit 205 that determines a possible discrete value for each combined output. In the field of equalizer design, use of a slicer to design the decision unit 205 is an example and details are therefore no more readdressed here.

In addition to the front equalizer 20, the rear equalizer 22 is also disposed in the illustrated multiple equalizer stages. The rear equalizer 22 also has a feed forward filter 222, a feedback filter 223, a decision unit 225, a first switcher 226 and a second switcher 227. Similarly, the combiner 224 combines the outputs from the feed forward filter 222 and the feedback filter 223. The combined outputs are decided by the decision unit 225 that determines a possible discrete value for each combined output.

In this example, the feed forward filter 202 and the feed forward filter 222 both receive the same input, e.g. a series of digital samples. The feedback filter 203 and the feedback filter 223 receive equalization output via the switcher 206 and the switcher 226, respectively. During initialization, however, the equalization output from the front equalizer 20 are not only supplied to the feedback filter 203 of the front equalizer 20 but also supplied to the feedback filter 223 via the switcher 227. Such arrangement may enhance the configurations of the rear equalizer 22, e.g. tap coefficients, because providing more useful information as soon as possible, which is one of technical benefits of the present invention.

Figure 3:
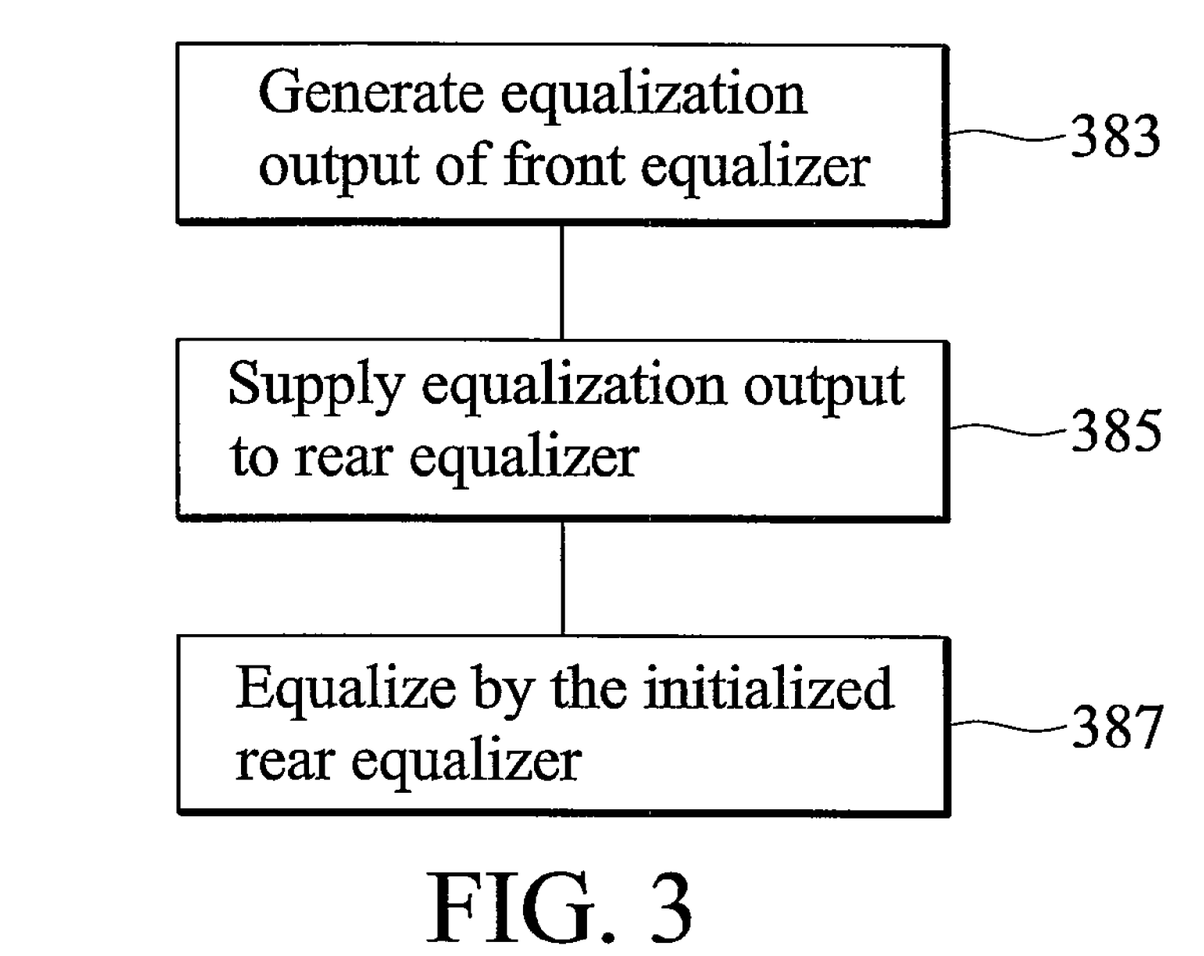
FIG. 3 illustrates a flowchart for speeding initialization of a rear equalizer by using equalization output of a front equalizer.

FIG. 3 is a flow chart illustrating a method for implementing such arrangement, which can be written as program codes, firmware or hardware logic to control the components mentioned above. For example, such method may be used for instruct when the switcher 227 should provide the equalization output from the front equalizer 20 to the rear equalizer 22, and when the rear equalizer 22 should start to operate under multiple equalizer stages. It is concluded that such method includes: generating equalization output (step 383) from a front equalizer; supplying the equalization output to a rear equalizer (step 385) so as to initialize a feedback filter of the rear equalizer (step 387).

Figure 4:
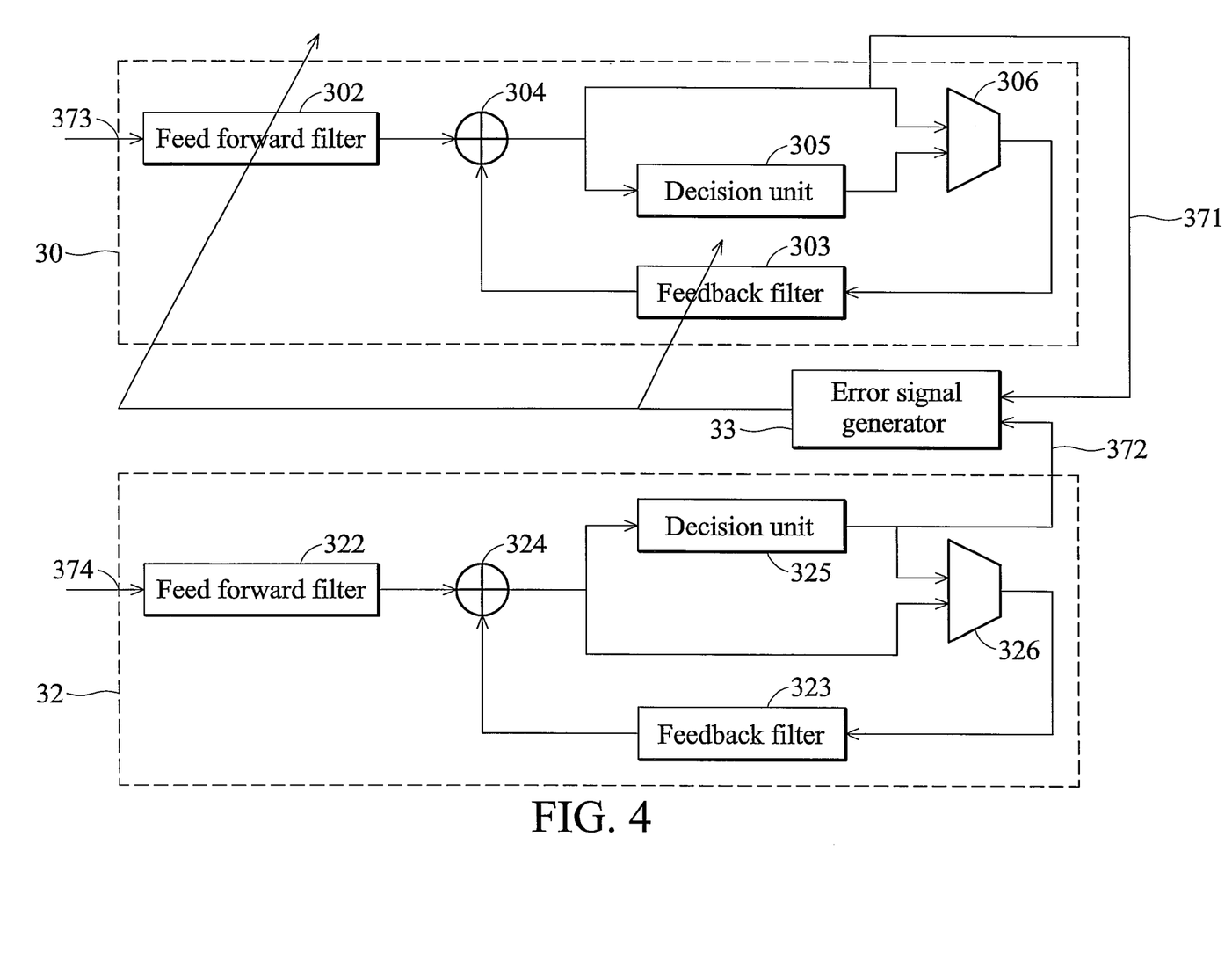
FIG. 4 illustrates a rear equalizer provides its decision output to a front equalizer so as to calculate a more accurate errors to adjust tap coefficients of the front equalizer.

FIG. 4 illustrates another interconnection between a front equalizer 30 and a rear equalizer 32. Similarly, the front equalizer 30 has a feed forward filter 302, a feedback filter 303, a combiner 304, a decision unit 305 and a switcher 306. The combiner 304 combines the outputs from the feed forward filter 302 and the feedback filter 303. The combined outputs are decided by the decision unit 305 that determines a possible discrete value for each combined output. In addition, the front equalizer 32 has a feed forward filter 322, a feedback filter 323, a combiner 324, a decision unit 325 and a switcher 326. The combiner 324 combines the outputs from the feed forward filter 322 and the feedback filter 323. The combined outputs are decided by the decision unit 325 that determines a possible discrete value for each combined output.

In addition to basic equalization configuration, the decision outputs 372 of the rear equalizer 32 are supplied to an error signal generator 33. In addition to the decision output of the rear equalizer 32, the equalization outputs 371 of the front equalizer 30 are also supplied to the error signal generator 33. The error signal generator 33 then compares the difference between the decision output 372 of the rear equalizer 32 and the equalization output 371 of the front equalizer 30 and generates an estimated error. Such error signal generator 33 can be implemented with known error generators used in the field of equalizer design to determine the level of the difference between an equalization output and a decision value so as to provide information to adjust tap coefficients filters in an equalizer. In other words, known error calculation functions, e.g. Sato Error Function, can all be applied here and no further details therefore will be addressed here.

In this example, the feed forward filter 302, the feedback filter 303 or both the feed forward filter 302 and the feedback filter 303 can be adjusted according to the estimated error. Since the rear equalizer 32 is at a latter stage compared with the front equalizer 30 in the multiple equalizer stages, the decision output of the rear equalizer 32 are therefore more accurate than decision output of the front equalizer 30. Under such arrangement, performance of the front equalizer 30 is therefore improved and consequently, further improves the rear equalizer 32 during further processing. Such improvement can also be regarded as another technical benefit of the present invention.

Figure 5:
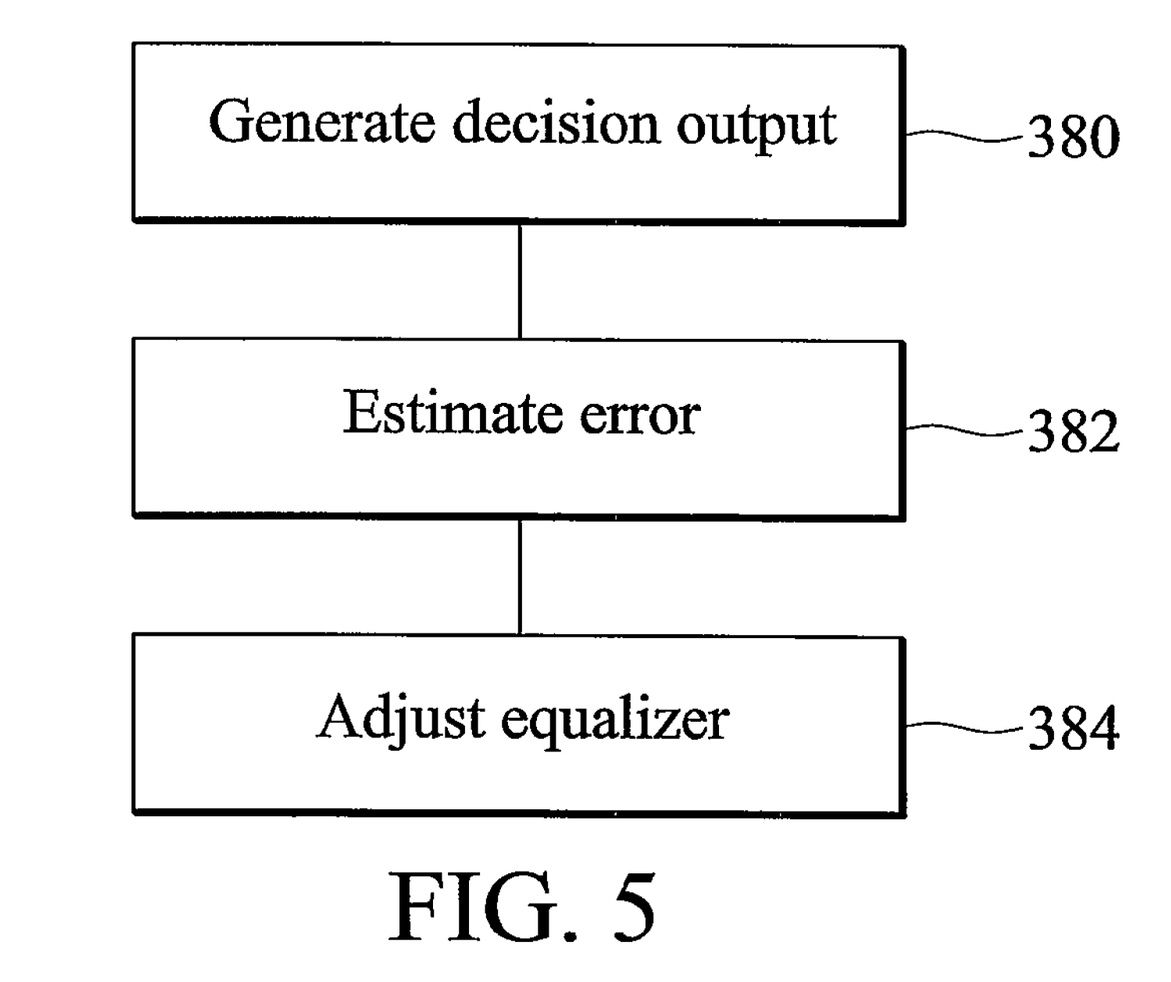
FIG. 5 illustrates a flowchart for providing decision error from a rear equalizer to a front equalizer to enhance tap coefficient adjustments of the front equalizer.

FIG. 5 is a flowchart that concludes a method for implementing such arrangement. Decision output is firstly generated by a rear equalizer (step 380). The decision output of the rear equalizer as well as the equalization output of a front equalizer are compared to estimate an estimated error (step 382). The estimated error then is used for adjusting the front equalizer (step 384), e.g. to adjust tap coefficients of the front equalizer.

Figure 6:
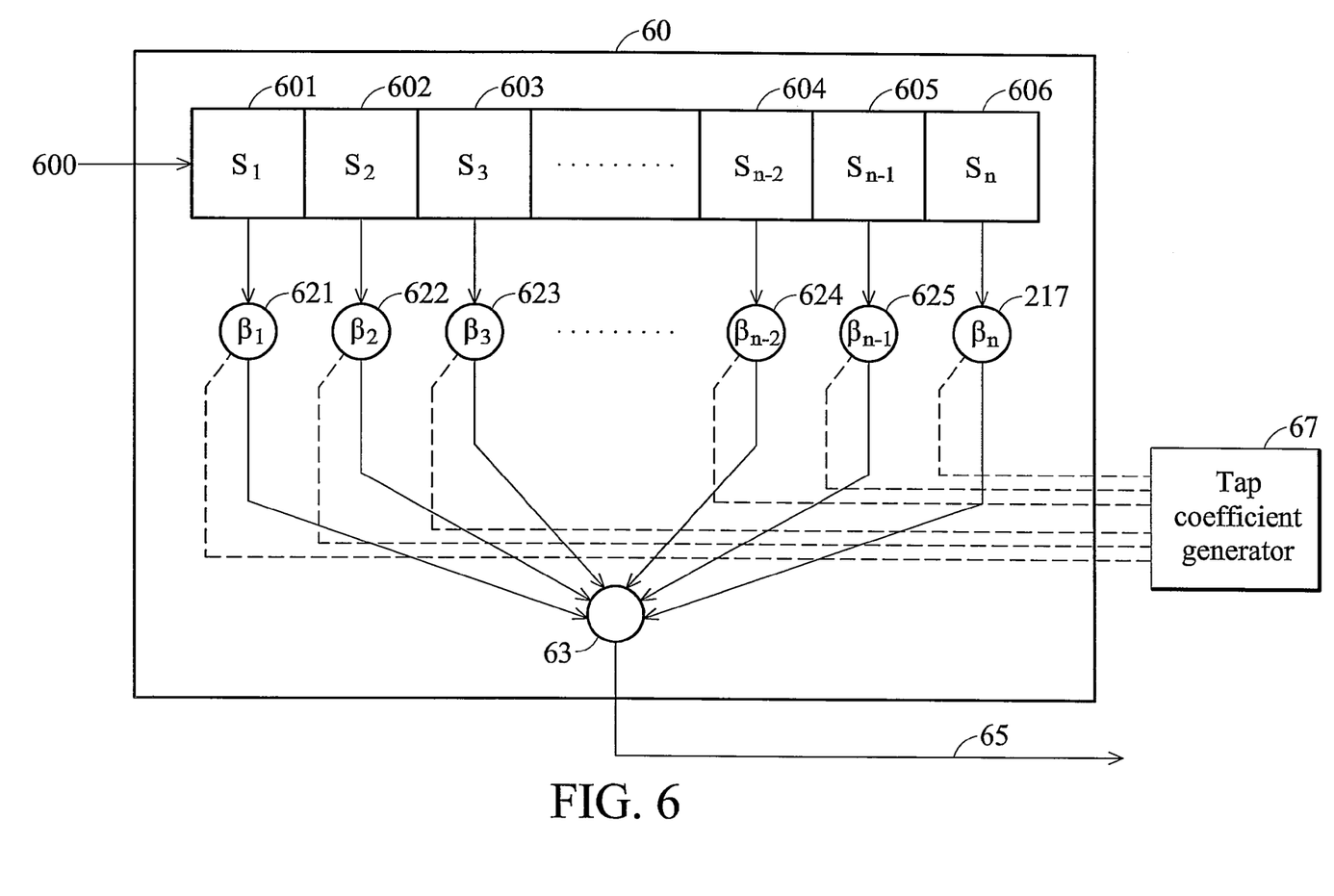
FIG. 6 illustrates a filter design that can be used for implementing the feed forward filter or the feedback filter that may be used in the equalization system of the present invention.

FIG. 6 illustrates a filter structure 60 that can be used for implementing the feed forward filter or the feedback filter. Digital samples 600 are input to a delay line circuit or a shift register row that contains a series of storage units 601, 602, 603, 604, 605 and 606. After each operation, new data are moved into the first storage unit 601 and data originally stored in the storage units 601, 602, 603, 604 and 605, except the last storage unit 606, are moved to one unit rightly. In each operation the tap contents $S_1, S_2, S_3, \ldots S_{n-2}, S_{n-1}, S_n$ are multiplied with tap coefficients of $\beta_1, \beta_2, \beta_3, \beta_{n-2}, \beta_{n-1}$ and $\beta_n$ by multipliers 621, 622, 623, 624, 625 and 626. Then, the multiplied values are summed by an adder 63 to generate an equalization output value 65 after each operation. These tap coefficients are modified by a tap coefficient generator 67 which depends on estimated errors obtained by comparing decision values and equalization output.

There are many ways to design equalizers and their filters well known in the field of equalizer design. FIG. 6, of course, is provided as an example instead of a limitation to the scope of the invention. The blocks illustrated in FIG. 1 to FIG. 6 can each be implemented by software, firmware, hardware or any of their combination once implementation are well known to persons skilled in the field of equalizer design.

Figure 7:
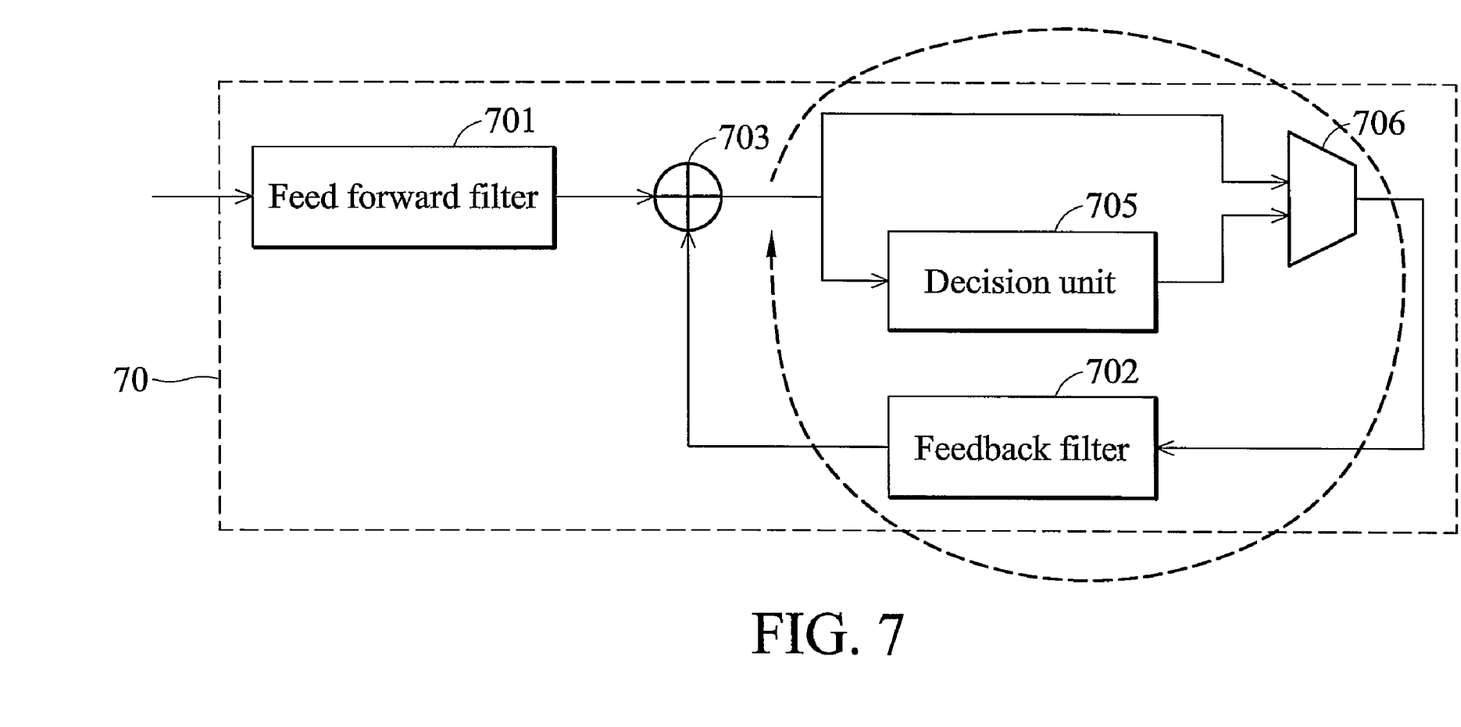
FIG. 7 illustrates an iterative equalizer.

Furthermore, one or more than one of the equalizers in the multiple equalizer levels can be designed, e.g. under proper control codes or corresponding signals, to be iterative equalizer. FIG. 7 illustrates an iterative equalizer 70 contains a feed forward filter 701, a feedback filter 702, a combiner 703, a decision unit 705 and a switcher 706. The major difference between the iterative equalizer and normal equalizers is that there will be multiple iterations of operations applied for even one set of values. In other words, the equalization output is supplied to the feedback filter 702 for multiple times until meeting desired condition or predetermined rounds of iterations. Theoretically, such arrangement may enhance certain level of equalization quality.

The equalization system with multiple equalizer stages as mentioned above can be used in various receivers of a communication system or a program broadcasting system. Persons skilled in the art should know how to embed such equalization system within different receivers by reference to different design requirements.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing equalization in a communication receiver, comprising:
   generating a decision output from a rear equalizer of the communication receiver;
   estimating an estimated error by comparing the decision output of the rear equalizer and equalization output of a front equalizer of the communication receiver; and
   adjusting the front equalizer according to the estimated error, wherein the communication receiver has more than two equalizer stages, and the front equalizer is at an earlier stage than the rear equalizer.

2. The method of claim 1, wherein a last equalizer from the equalizer stages outputs a final equalization result to be used in the communication receiver while equalization output of other equalizers of the equalizer stages are supplied to one or more than one equalizers in latter stages.

3. The method of claim 2, wherein the front equalizer is at previously adjacent to the rear equalizer in the equalizer stages.

4. The method of claim 2, further comprising:
   supplying the equalization output of the front equalizer to a feedback filter of the rear equalizer.

5. The method of claim 1, wherein at least one of the front equalizer and the rear equalizer is an iterative equalizer, and the method further comprising: performing more than one rounds of equalization within the iterative equalizer.

6. A method for performing equalization in a communication receiver, comprising:
   generating an equalization output from a front equalizer of the communication receiver;
   supplying the equalization output to a feedback filter of a rear equalizer of the communication receiver for initialization; and
   performing equalization in the rear equalizer by the initialized feedback filter of the rear equalizer, wherein the communication receiver has more than two equalizer stages, and the front equalizer is at an earlier stage than the rear equalizer.

7. The method of claim 6, wherein the front equalizer is previously adjacent to the rear equalizer in the equalizer stages.

8. The method of claim 6, wherein a last equalizer of the equalizer stages outputs a final equalization result to be used in the communication receiver and other equalization output of other equalizers of the equalizer stages are supplied to one or more than one equalizers in latter stages.

9. The method of claim 8, further comprising:
   generating a decision output from the rear equalizer;
   estimating an estimated error by comparing the decision output of the rear equalizer and the equalization output of the front equalizer; and
   adjusting the front equalizer based on the estimated error.

10. The method of claim 6, wherein at least one of the front equalizer and the rear equalizer is an iterative equalizer, and the method further comprising: performing more than one rounds of equalization within the iterative equalizer.

11. An equalization system used in a communication receiver, comprising:
    a front equalizer comprising a first feed forward filter, a first feedback filter, a first combiner and a first decision unit, wherein the first combiner combines output of the first feed forward filter and the first feedback filter to generate first equalization output; the first decision unit decides first set of discrete values based on the first equalization output; and the first equalization output are supplied to the first feedback filter;
    a rear equalizer comprising a second feed forward filter, a second feedback filter, a second combiner and a second decision unit, wherein the second combiner combines output of the second feed forward filter and the second feedback filter to generate second equalization output; the second decision unit decides second set of discrete values based on the second equalization output; and the second equalization output are supplied to the second feedback filter;
    an error estimator receiving the second set of discrete values and the first equalization output to obtain an estimated error; and
    a tap coefficient unit for adjusting tap coefficients of at least one of the first feed forward filter and the first feedback filter, wherein the front equalizer is at an earlier stage than the rear equalizer in multiple equalizer stages of the communication receiver.

12. The equalization system of claim 11, wherein a last equalizer of the equalizer stages outputs a final equalization result to be used in the communication receiver while equalization output of other equalizers of the equalizer stages are supplied to one or more than one equalizers in latter stages.

13. The equalization system of claim 12, wherein the front equalizer is previously adjacent to the rear equalizer in the multiple equalizer stages.

14. The equalization system of claim 12, wherein the first equalization output are supplied to the second feedback filter for initialization.

15. The equalization system of claim 11, wherein at least one of the front equalizer and the rear equalizer is an iterative equalizer, and the iterative equalizer performs more than one rounds of equalization within the iterative equalizer.

16. An equalization system used in a communication receiver, comprising:
    a front equalizer comprising a first feed forward filter, a first feedback filter, a first combiner and a first decision unit, wherein the first combiner combines output of the first feed forward filter and the first feedback filter to generate first equalization output; the first decision unit decides first set of discrete values based on the first equalization output; and the first equalization output are supplied to the first feedback filter;
    a rear equalizer comprising a second feed forward filter, a second feedback filter, a second combiner and a second decision unit, wherein the second combiner combines output of the second feed forward filter and the second feedback filter to generate second equalization output; the second decision unit decides second set of discrete values based on the second equalization output; and the second equalization output are supplied to the second feedback filter; and wherein the first equalization output are supplied to the second feedback filter for initialization.

17. The equalization system of claim 16, wherein the front equalizer is previously adjacent to the rear equalizer in the equalizer stages.

18. The equalization system of claim 17, wherein a last equalizer of the equalizer stages outputs a final equalization result to be used in the communication receiver while equalization output of other equalizers of the equalizer stages are supplied to one or more than one equalizers in latter stages.

19. The equalization system of claim 18, further comprising:
an error estimator receiving the second set of discrete values and the first equalization output to obtain an estimated error; and
a tap coefficient unit for adjusting tap coefficients of at least one of the first feed forward filter and the first feedback filter.

20. The equalization system of claim 16, wherein at least of the front equalizer and the rear equalizer is an iterative equalizer, and the iterative equalizer performs more than one rounds of equalization within the iterative equalizer.

* * * * *